(12) United States Patent
Kawaguchi

(10) Patent No.: US 11,429,322 B2
(45) Date of Patent: Aug. 30, 2022

(54) IMAGE FORMING APPARATUS CAPABLE OF REDUCING THE NUMBER OF TIMES OF RETURNS FROM POWER SAVING MODE

(71) Applicant: KYOCERA Document Solutions Inc., Osaka (JP)

(72) Inventor: Tomoya Kawaguchi, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 17/516,959

(22) Filed: Nov. 2, 2021

(65) Prior Publication Data

US 2022/0147287 A1 May 12, 2022

(30) Foreign Application Priority Data

Nov. 6, 2020 (JP) .............................. JP2020-185576

(51) Int. Cl.
*G06F 3/12* (2006.01)
*H04N 1/00* (2006.01)

(52) U.S. Cl.
CPC .......... *G06F 3/1221* (2013.01); *G06F 3/1259* (2013.01); *H04N 1/00896* (2013.01)

(58) Field of Classification Search
CPC .. G06F 3/1221; G06F 3/1259; H04N 1/00896
USPC ..................................................... 358/1.14
See application file for complete search history.

(56) References Cited

U.S. PATENT DOCUMENTS

| | | | | |
|---|---|---|---|---|
| 2009/0010671 A1* | 1/2009 | Hashimoto | ........... | G06F 1/3203 713/300 |
| 2011/0182208 A1* | 7/2011 | Shima | ................ | H04N 1/00891 370/254 |
| 2014/0355052 A1* | 12/2014 | Mikashima | ........ | H04N 1/00896 358/1.15 |

FOREIGN PATENT DOCUMENTS

JP        2011-183701        9/2011

* cited by examiner

*Primary Examiner* — Allen H Nguyen
(74) *Attorney, Agent, or Firm* — Lex IP Meister, PLLC

(57) ABSTRACT

An image forming device is provided with a signal output unit which outputs an interrupt signal when storage of a print job input from the outside in a memory is completed, a processor which switches the operation mode to a normal mode when an operation mode of the own device is a power saving mode when an interrupt signal output from the signal output unit is input, executes each of the print jobs stored in the memory, and switches the operation mode to the power saving mode after the completion of printing, and a signal delay unit which can delay the input of the interrupt signal output from the signal output unit to the processor when the operation mode is the power saving mode.

5 Claims, 4 Drawing Sheets

IMAGE FORMING APPARATUS CAPABLE OF REDUCING THE NUMBER OF TIMES OF RETURNS FROM POWER SAVING MODE

INCORPORATION BY REFERENCE

This application is based upon and claims the benefit of priority from the corresponding Japanese Patent Application No. 2020-185576 filed on Nov. 6, 2020, the entire contents of which are incorporated herein by reference.

BACKGROUND

The present disclosure relates to an image forming apparatus.

An image forming apparatus is known in which an operation mode of the own device can be switched between a normal mode and a power saving mode in which power consumption is reduced compared with the normal mode. For example, in the image forming apparatus, when a print job is input from outside and the operation mode is the power saving mode, the operation mode is switched to the normal mode to execute the print job. After completion of execution of the print job, the operation mode is switched to the power saving mode.

SUMMARY

An image forming apparatus according to the present disclosure includes a signal output unit, a processor, and a signal delay unit. The signal output unit outputs an interrupt signal when storage of a print job input from the outside into the memory is completed. When the interrupt signal output from the signal output unit is input and the operation mode of the own device is a power saving mode in which power consumption is reduced compared with the normal mode, the processor switches the operation mode to the normal mode, executes batch printing processing for executing each of the print jobs stored in the memory until there are no unexecuted print jobs in the memory, and switches the operation mode to the power saving mode after the completion of the batch printing processing. When the operation mode is the power saving mode, the signal delay unit can delay the input of the interrupt signal output from the signal output unit to the processor.

Hereinafter, embodiments of the present disclosure will be described with reference to the drawings. It should be noted that the following embodiments are merely examples of embodying the present disclosure and do not limit the technical scope of the present disclosure.

[Configuration of Image Forming Apparatus 10]

First, the configuration of the image forming apparatus 10 according to the embodiment of the present disclosure will be described with reference to FIGS. 1 and 2.

The image forming apparatus 10 is a multi-functional device having a plurality of functions such as a scanning function for reading an image of a document, a print function for forming an image based on image data, a facsimile function, and a copying function. The image forming apparatus 10 may be a printer, a facsimile machine, a copying machine, or the like.

Figure 1:
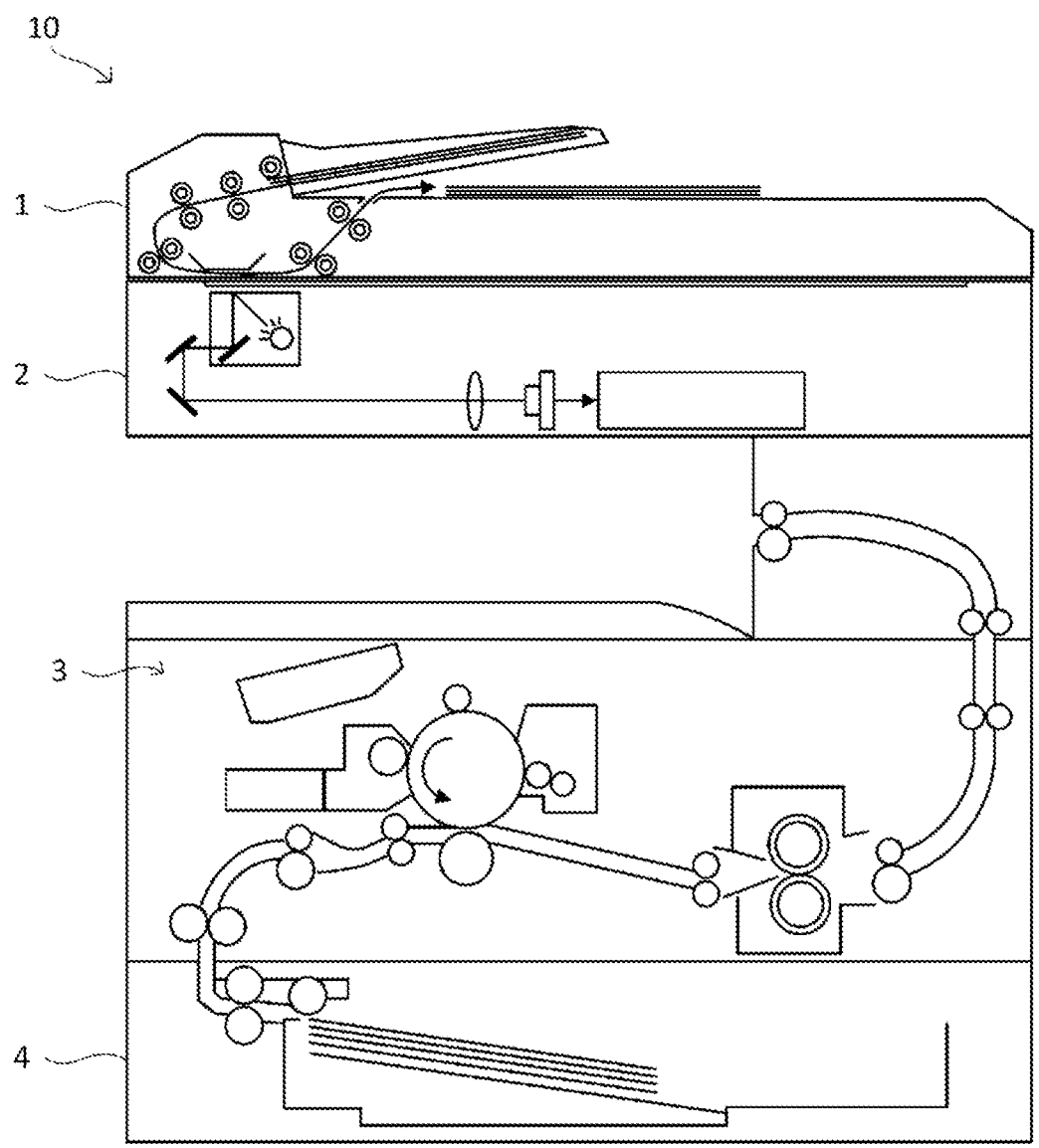
FIG. 1 is a diagram showing a configuration of an image forming apparatus according to an embodiment of the present disclosure.
Figure 2:
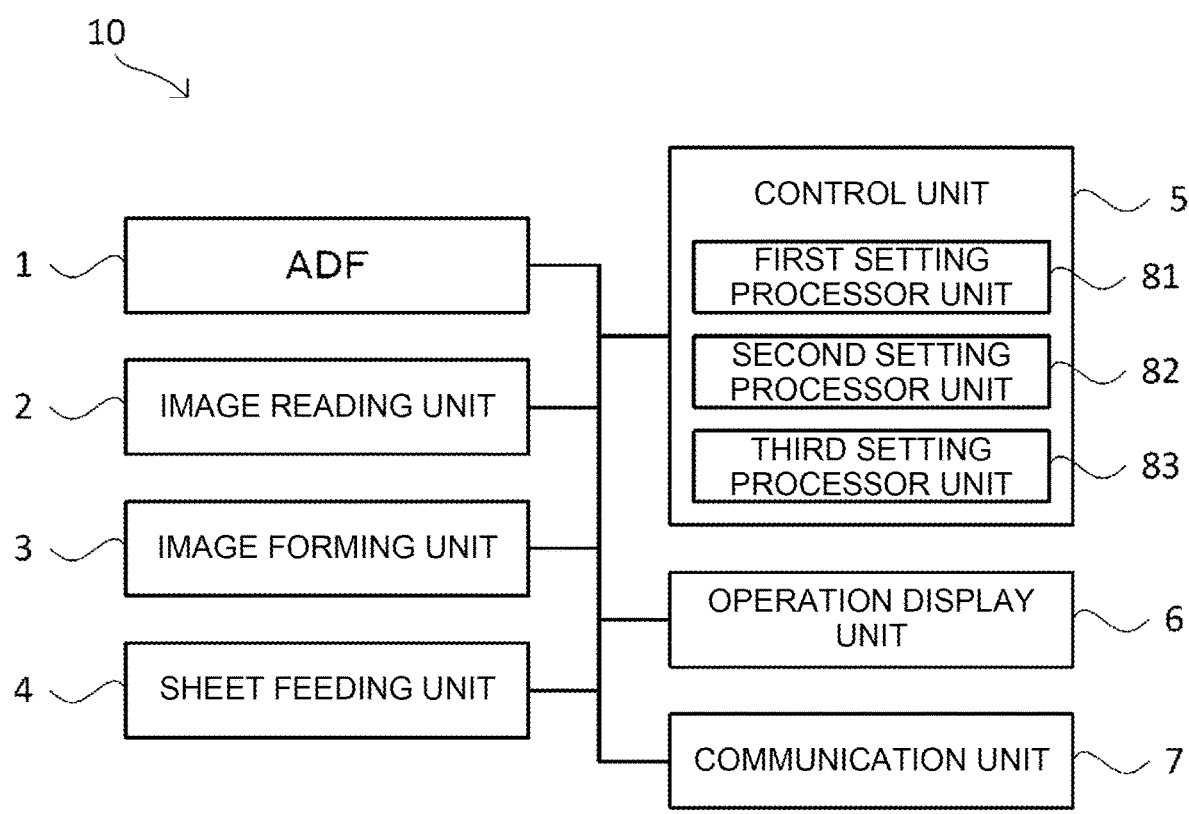
FIG. 2 is a block diagram showing a system configuration of an image forming apparatus according to an embodiment of the present disclosure.

As shown in FIGS. 1 and 2, the image forming apparatus 10 includes an auto document feeder (ADF) 1, an image reading unit 2, an image forming unit 3, a sheet feeding unit 4, a control unit 5, an operation display unit 6, and a communication unit 7.

The ADF 1 transports a document to be read by the scanning function. For example, the ADF 1 includes a document setting unit, a plurality of transport rollers, a document pressing unit, and a paper discharge unit.

The image reading unit 2 realizes the scanning function. For example, the image reading unit 2 includes a document table, a light source, a plurality of mirrors, an optical lens, and a charge coupled device (CCD).

The image forming unit 3 implements the print function. For example, the image forming unit 3 forms an image by an electrophotographic system. For example, the image forming unit 3 includes a photosensitive drum, a charging roller, an optical scanning device, a developing device, a transport roller, a cleaning device, a fixing device, and a paper discharge tray.

The sheet feeding unit 4 feeds sheets to the image forming unit 3. For example, the sheet feeding unit 4 includes a paper feeding cassette, a sheet feeding path, and a plurality of transport rollers.

The control unit 5 integrally controls the image forming apparatus 10.

The operation display unit 6 is a user interface of the image forming apparatus 10. For example, the operation display unit 6 includes a display unit such as a liquid crystal display that displays various kinds of information in response to a control instruction from the control unit 5, and an operation unit such as an operation key or a touch panel that inputs various kinds of information to the control unit 5 in response to a user's operation.

The communication unit 7 is a communication interface for performing wired or wireless data communication with a communication device such as an external information processing device via a communication network such as the Internet or a LAN.

[Configuration of Control Unit 5]

Next, the configuration of the control unit 5 will be described with reference to FIGS. 2 and 3.

Figure 3:
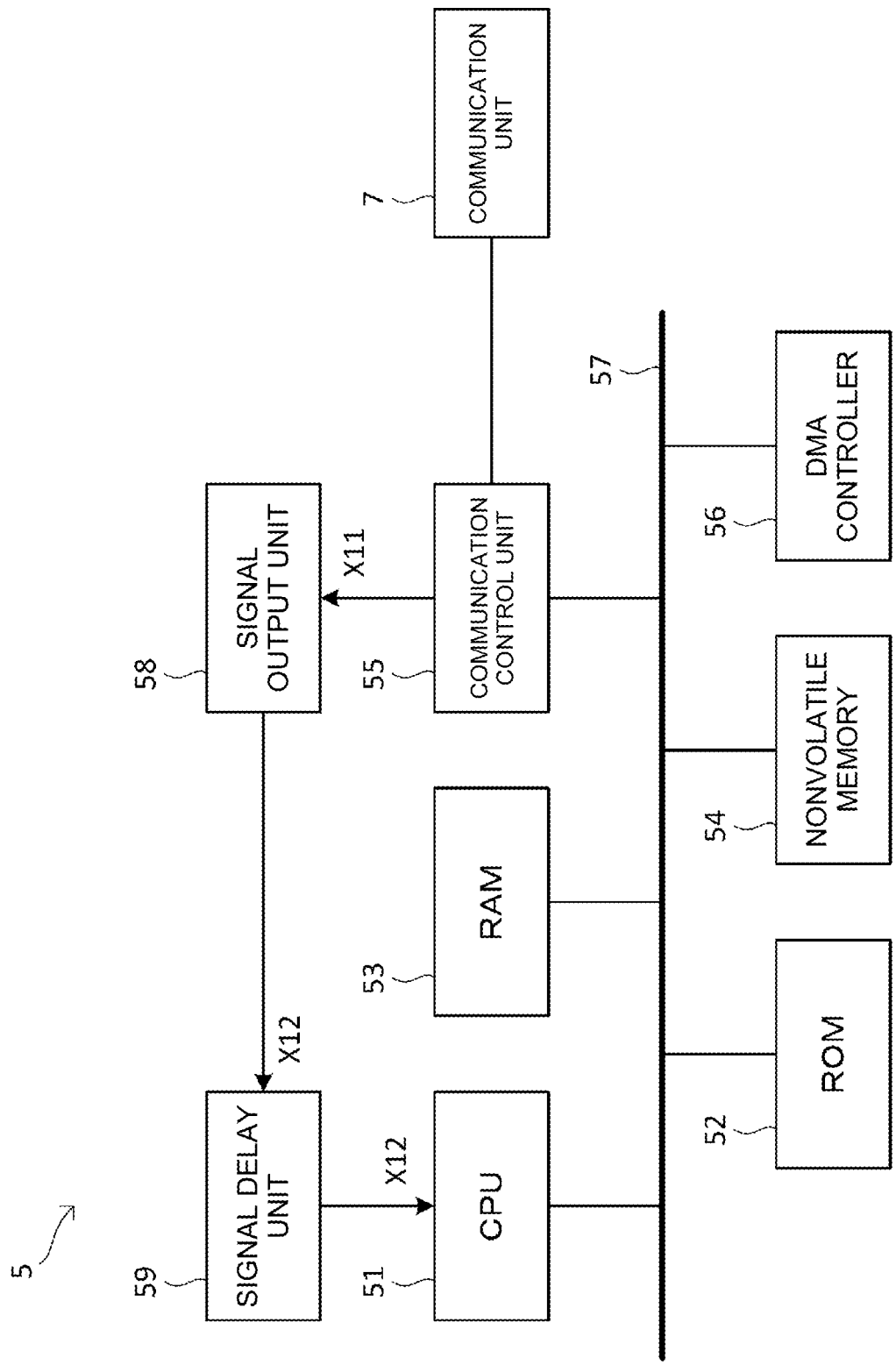
FIG. 3 is a block diagram showing a configuration of a control unit of an image forming apparatus according to an embodiment of the present disclosure.

As shown in FIG. 3, the control unit 5 includes a CPU 51, a ROM 52, a RAM 53, a nonvolatile memory 54, a communication control unit 55, a DMA controller 56, a bus 57, a signal output unit 58, and a signal delay unit 59.

As shown in FIG. 3, in the control unit 5, the CPU 51, the ROM 52, the RAM 53, the nonvolatile memory 54, the communication control unit 55, and the DMA controller 56 are communicably connected by the bus 57.

The CPU 51 is a processor that executes various kinds of arithmetic processing. The ROM 52 is a nonvolatile storage device. In the ROM 52, information such as a control program for causing the CPU 51 to execute various processes is stored in advance. The CPU 51 is an example of a processor of the present disclosure.

In the control unit 5, various control programs previously stored in the ROM 52 are executed by the CPU 51. Thus, the image forming apparatus 10 is generally controlled by the control unit 5.

For example, the CPU 51 can switch the operation mode of the own device between the normal mode and the power saving mode. Here, the power saving mode is the operation mode in which power consumption is reduced compared to the normal mode. For example, in the power saving mode, power supply to each part of the image forming unit 3 is stopped. In the normal mode, power is supplied to each part of the image forming unit 3, and the temperature of the fixing device is controlled.

The RAM 53 is a volatile storage device. The RAM 53 is used as a temporary storage memory (work area) for various kinds of processing executed by the CPU 51. The nonvolatile memory 54 is a nonvolatile storage device such as a NOR type flash memory, a NAND type flash memory, and a ferroelectric memory (FRAM). The RAM 53 is an example of a memory of the present disclosure.

The communication control unit 55 controls the communication unit 7. The communication control unit 55 is composed of electronic circuits such as an integrated circuit (ASIC, DSP).

For example, the communication control unit 55 controls the communication unit 7 to receive a print job transmitted from an external information processing apparatus.

The DMA controller 56 reads and writes data from and to the RAM 53 in place of the CPU 51.

For example, when the print job transmitted from an external information processing apparatus is received, the DMA controller 56 stores the print job in the RAM 53 in place of the CPU 51.

For example, when receiving the print job transmitted from an external information processing apparatus, the communication control unit 55 instructs the DMA controller 56 to store the print job in the RAM 53. The DMA controller 56 stores the print job in the RAM 53 in response to an instruction from the communication control unit 55.

When the storage of the print job received from the external information processing apparatus by the DMA controller 56 in the RAM 53 is completed, the communication control unit 55 outputs a notification signal X11 (see FIG. 3) indicating that the print job has been stored in the RAM 53. The notification signal X11 is input to the signal output unit 58.

The signal output unit 58 outputs an interrupt signal X12 (see FIG. 3) when the storage of the print job input from the outside in the RAM 53 is completed. Specifically, when the notification signal X11 output from the communication control unit 55 is input, the signal output unit 58 outputs the interrupt signal X12.

When the interrupt signal X12 output from the signal output unit 58 is input, and when the operation mode is the power saving mode, the CPU 51 switches the operation mode to the normal mode. Subsequently, the CPU 51 executes batch printing processing for executing each of the print jobs stored in the RAM 53 until there are no print jobs that have not yet been executed in the RAM 53. After the completion of the batch printing processing, the CPU 51 switches the operation mode to the power saving mode.

[Operation Control Processing]

Figure 4:
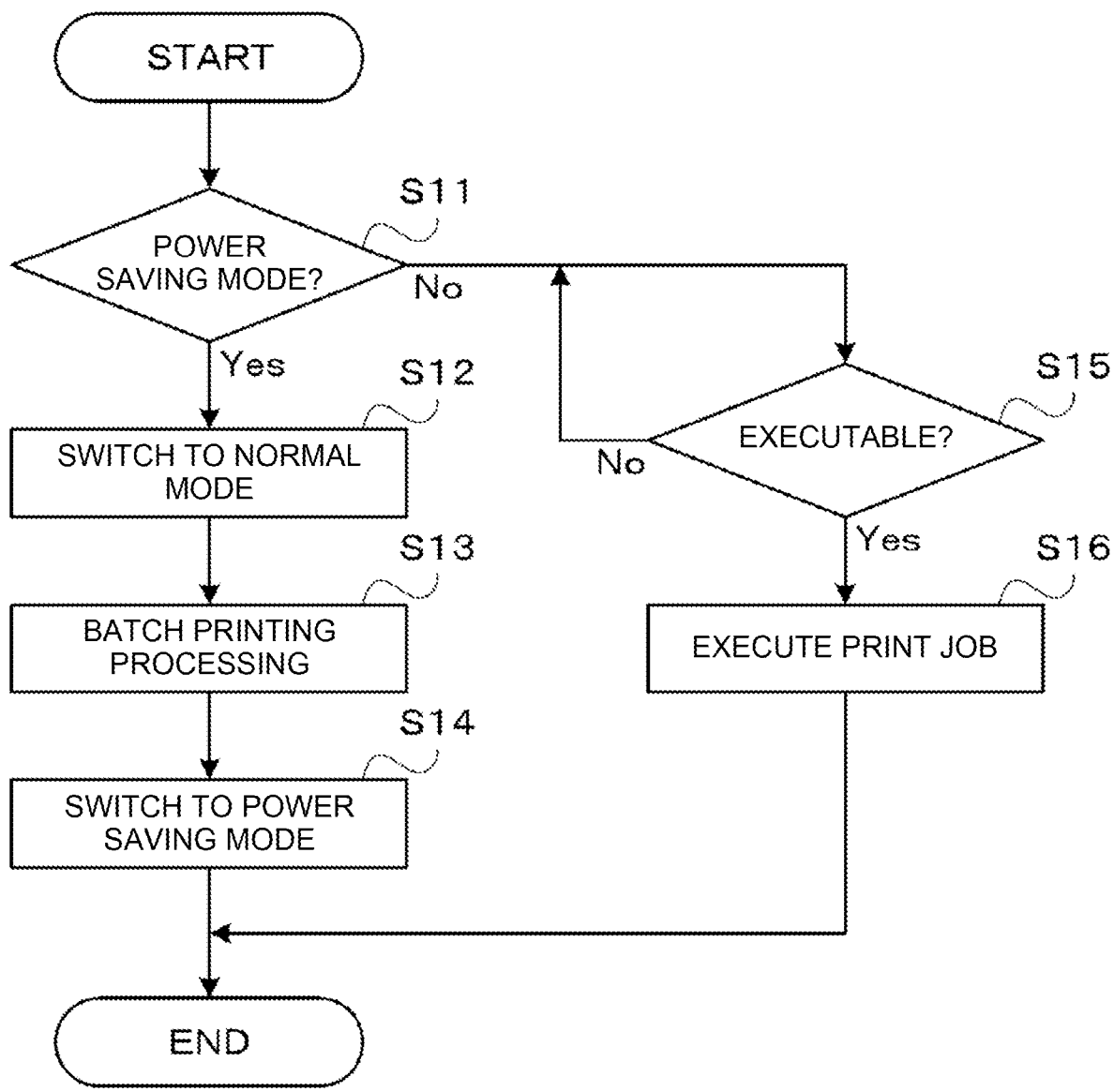
FIG. 4 is a flowchart showing an example of operation control processing executed by the image forming apparatus according to the embodiment of the present disclosure.

The operation control processing executed by the CPU 51 in response to the input of the interrupt signal X12 will now be described with reference to FIG. 4. Here, steps S11, S12 . . . represent the number of the processing procedure (step) executed by the CPU 51.

<Step S11>

First, in step S11, the CPU 51 determines whether or not the operation mode is the power saving mode.

If the CPU 51 determines that the operation mode is the power saving mode (Yes side in S11), the process proceeds to step S12. If the operation mode is not the power saving mode (No side in S11), the CPU 51 proceeds the processing to step S15.

<Step S12>

In step S12, the CPU 51 switches the operation mode to the normal mode.

<Step S13>

In step S13, the CPU 51 executes the batch printing processing.

<Step S14>

In step S14, the CPU 51 switches the operation mode to the power saving mode.

<Step S15>

In step S15, the CPU 51 determines whether or not the print job whose storage in the RAM 53 is notified by the interrupt signal X12 can be executed.

For example, the CPU 51 determines that the print job can be executed when there is no other print job whose execution order is earlier than that of the print job whose storage in the RAM 53 is notified by the interrupt signal X12.

If the CPU 51 determines that the print job can be executed (Yes side in S15), the process proceeds to step S16. If the execution of the print job is not possible (No side in S15), the CPU 51 waits for the execution of the print job to be possible in step S15.

<Step S16>

In step S16, the CPU 51 executes the print job whose storage in RAM 53 is notified by the interrupt signal X12.

The CPU 51 may switch the operation mode to the power saving mode after the execution of the processing in step S16.

By the way, in the image forming apparatus 10, when the input frequency of the print job from the outside is high, the number of times of returns from the power saving mode, that is, the number of times of executing step S12 of the operation control processing increases, and accordingly, the power consumption in the image forming apparatus 10 increases.

On the other hand, in the image forming apparatus 10 according to the embodiment of the present disclosure, as described below, it is possible to reduce the number of times of returns from the power saving mode in response to input of the print job from the outside.

When the operation mode is the power saving mode, the signal delay unit 59 can delay the input of the interrupt signal X12 output from the signal output unit 58 to the CPU 51.

For example, when the operation mode is the power saving mode and the preset delay time is longer than 0 seconds, the signal delay unit 59 delays the input of the interrupt signal X12 output from the signal output unit 58 to the CPU 51 by the delay time.

On the other hand, when the operation mode is the power saving mode and the preset delay time is 0 seconds, the signal delay unit 59 inputs the interrupt signal X12 output from the signal output unit 58 to the CPU 51 without delay. When the operation mode is the normal mode, the signal delay unit 59 inputs the interrupt signal X12 output from the signal output unit 58 to the CPU 51 without delay.

The CPU 51 checks the presence or absence of an unexecuted print job in the RAM 53 at an appropriate timing during execution of the batch printing processing. Therefore, it is not necessary to input the interrupt signal X12 to the CPU 51 during the execution of the batch printing processing.

Therefore, in the image forming apparatus 10, input of the interrupt signal X12 to the CPU 51 during execution of the batch printing processing is restricted.

Specifically, the signal delay unit 59 can delay the input of a specific interrupt signal first input from the signal output unit 58 to the CPU 51 while the operation mode is in the power saving mode. Then, the signal delay unit 59 restricts the input of the interrupt signal X12 input from the signal output unit 58 to the CPU 51 during a period from the input of the specific interrupt signal from the signal output unit 58 until the switching of the next operation mode to the power saving mode. This prevents unnecessary interrupt signals X 12 from being input to the CPU 51.

The CPU 51 may notify the signal delay unit 59 of the end of the batch printing processing. In this case, the signal delay unit 59 may restrict the input of the interrupt signal X12 input from the signal output unit 58 to the CPU 51 during a period from the input of the specific interrupt signal from the signal output unit 58 until the end of the batch printing processing executed first after the input.

As shown in FIG. 2, the control unit 5 includes a first setting processor unit 81, a second setting processor unit 82, and a third setting processor unit 83.

Specifically, the CPU 51 of the control unit 5 functions as the above described components by executing the control program stored in the ROM 52.

Note that the first setting processor unit 81, the second setting processor unit 82, and the third setting processor unit 83 may be electronic circuits provided separately from the CPU 51.

The first setting processor unit 81 sets the delay time of the interrupt signal X12 by the signal delay unit 59 in accordance with a predetermined setting operation.

For example, the first setting processor unit 81 displays a setting screen used for the setting operation on the operation display unit 6 in accordance with a predetermined call operation on the operation display unit 6. For example, in the setting screen, the delay time can be set within a range from 0 seconds to a predetermined upper limit time. Then, the first setting processor unit 81 sets the delay time in accordance with a user operation on the setting screen, that is, the setting operation.

The second setting processor unit 82 sets the delay time of the interrupt signal X12 by the signal delay unit 59 on the basis of the printing frequency of the own device in a predetermined specific period.

For example, the second setting processor unit 82 sets the delay time at a timing when the operation mode is switched to the power saving mode.

For example, the specific period is a two hour period ending at the present time. The specific period may be from the beginning to the end of a day including a timing one week, one month, or one year backward from the present time. Further, the specific period may be a period of an arbitrary length including a timing earlier than the present time by an arbitrary number of hours, days, weeks, months, or years.

For example, every time the print job is executed in the image forming apparatus 10, print history information including the execution history of the print job is stored in the nonvolatile memory 54. For example, the print history information includes an execution date and time of the print job, identification information of print target data in the print job, identification information of the information processing apparatus as an input source of the print job, and an execution time of the print job.

The second setting processor unit 82 acquires the printing frequency in the specific period based on the print history information stored in the nonvolatile memory 54. Here, the printing frequency is a value calculated by dividing the number of executions of the print job in the specific period by the specific period. In other words, the printing frequency is the number of times the print job is executed per unit time. For example, if the specific period is a two hour period ending at the present time, the printing frequency is the number of times the print job is executed per hour.

For example, the second setting processor unit 82 sets the delay time so that the delay time becomes shorter as the printing frequency is higher.

For example, the second setting processor unit 82 sets the delay time based on the reciprocal of the printing frequency, that is, the average value of the execution interval of the print job in the specific period. For example, the second setting processor unit 82 sets, as the delay time, a value calculated by subtracting the average value of the execution time of the print job executed in the specific period from the reciprocal of the printing frequency. If the value is negative, the second setting processor unit 82 may set the delay time to 0 seconds. Thus, it is possible to reduce the number of times of returns from the power saving mode in response to an input of the print job from outside, and to suppress a decrease in convenience due to a delay in the start of execution of the print job.

The second setting processor unit 82 may set the first threshold value as the delay time when the value calculated by subtracting the average value of the execution time of the print job executed in the specific period from the reciprocal of the printing frequency exceeds a predetermined first threshold value. Thus, it is possible to prevent the convenience from falling below a certain level.

The second setting processor unit 82 may set the delay time to 0 seconds when the value calculated by subtracting the average value of the execution time of the print job executed in the specific period from the reciprocal of the printing frequency exceeds a second threshold value higher than the first threshold value. Thus, it is possible to prevent the execution of the print job from being delayed even in cases when the possibility of reducing the number of returns from the power saving mode by delaying the input of the interrupt signals X12 is sufficiently low.

The second setting processor unit 82 may set the delay time to 0 seconds when the printing frequency is equal to or less than a predetermined third threshold value, and may set the delay time to a predetermined fixed time or a time acquired based on a difference between the printing frequency and the third threshold value when the printing frequency exceeds the third threshold value. For example, the second setting processor unit 82 may set the delay time so that the delay time becomes longer as the difference between the printing frequency and the third threshold value becomes larger.

The print history information may be stored in a server provided outside the image forming apparatus 10. In this case, the second setting processor unit 82 may acquire the print history information from the server. Further, the print history information may include identification information of the image forming apparatus 10 that has executed the print job.

The third setting processor unit 83 sets the delay time of the interrupt signal X12 by the signal delay unit 59 based on the data amount of the print job stored first in the RAM 53 after the operation mode is switched to the power saving mode.

For example, the third setting processor unit 83 sets the delay time based on the data amount of the print job at a timing when the print job is first input from an external information processing device after switching the operation mode to the power saving mode.

For example, the third setting processor unit 83 sets the delay time so that the delay time becomes shorter as the amount of data of the print job stored first in the RAM 53 after the operation mode is switched to the power saving mode is larger.

When the delay time is set by the first setting processor unit 81, the control unit 5 sets the functions of the second setting processor unit 82 and the third setting processor unit 83 to be invalid. Until the delay time is set by the first setting processor unit 81, the control unit 5 sets only the function of the processor unit designated in advance or selected by the operation of the user among the second setting processor unit 82 and the third setting processor unit 83 to be valid.

The control unit 5 does not necessarily include one or more of the first setting processor unit 81, the second setting processor unit 82, and the third setting processor unit 83.

Thus, in the image forming apparatus 10, when the operation mode is the power saving mode, the input of the interrupt signal X12 output from the signal output unit 58 to the CPU 51 can be delayed. As a result, it is possible to delay the transition timing to the power saving mode after the end of the print job executed due to the input of the interrupt signal X12, and it is possible to avoid the returning from the power saving mode due to the input of the print job during the period from the original transition timing to the transition timing after the delay. Accordingly, it is possible to reduce the number of times of returns from the power saving mode in response to input of the print job from the outside.

What is claimed is:

1. An image forming apparatus comprising:
    a signal output unit outputting an interrupt signal when storage of an externally input print job in a memory is completed;
    a processor that, when the interrupt signal output from the signal output unit is input and an operation mode of the own device is a power saving mode in which power consumption is reduced compared to the normal mode, switches the operation mode to the normal mode, executes batch printing processing for executing each of the print jobs stored in the memory until there are no unexecuted print jobs in the memory, and switches the operation mode to the power saving mode after completion of the batch printing processing; and
    a signal delay unit capable of delaying input of the interrupt signal output from the signal output unit to the processor when the operation mode is the power saving mode.

2. The image forming apparatus according to claim 1, comprising
    a first setting processor unit setting a delay time of the interrupt signal by the signal delay unit in accordance with a predetermined setting operation.

3. The image forming apparatus according to claim 1, comprising
    a second setting processor unit setting a delay time of the interrupt signal by the signal delay unit based on a printing frequency of the own device in a predetermined specific period.

4. The image forming apparatus according to claim 1, comprising
    a third setting processor unit setting a delay time of the interrupt signal by the signal delay unit based on a data amount of the print job stored first in the memory after the operation mode is switched to the power saving mode.

5. The image forming apparatus according to claim 1, wherein
    the signal delay unit can delay input, to the processor of a specific interrupt signal first input from the signal output unit while the operation mode is in the power saving mode, and restricts the input of the interrupt signal input from the signal output unit to the processor during a time period between the input of the specific interrupt signal and switching of the next operation mode to the power saving mode.

* * * * *